(12) United States Patent
Ishikawa et al.

(10) Patent No.: US 8,887,854 B2
(45) Date of Patent: Nov. 18, 2014

(54) ELECTRICAL UNIT CONTAINING STRUCTURE FOR SADDLE TYPE ELECTRIC VEHICLE

(75) Inventors: Jun Ishikawa, Wako (JP); Takeo Nakazawa, Wako (JP); Hiroyuki Nishimori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 13/560,127

(22) Filed: Jul. 27, 2012

(65) Prior Publication Data
US 2013/0032427 A1 Feb. 7, 2013

(30) Foreign Application Priority Data

Aug. 4, 2011 (JP) .................. 2011-171003

(51) Int. Cl.
*B62K 11/00* (2006.01)
*B62M 7/00* (2010.01)
*B62K 11/04* (2006.01)

(52) U.S. Cl.
CPC ............. *B62K 11/04* (2013.01); *B62K 2208/00* (2013.01); *B62K 2204/00* (2013.01)
USPC ........................................ 180/220; 180/65.1

(58) Field of Classification Search
CPC ........ B60K 1/00; B60K 1/04; B62K 2204/00; B62M 6/40; B62M 6/45; B62M 6/90
USPC .................................. 180/65.1, 220
See application file for complete search history.

(56) References Cited

U.S. PATENT DOCUMENTS

| | | | | |
|---|---|---|---|---|
| 3,554,311 A | * | 1/1971 | Thompson et al. | 180/220 |
| 3,773,131 A | * | 11/1973 | Jaulmes | 180/206.5 |
| 5,501,292 A | * | 3/1996 | Kawashima et al. | 180/220 |
| 5,657,830 A | * | 8/1997 | Kawashima et al. | 180/220 |
| 6,152,251 A | * | 11/2000 | Nagai et al. | 180/220 |
| 6,155,369 A | * | 12/2000 | Whittaker | 180/220 |
| 7,778,028 B2 | * | 8/2010 | Tanabe et al. | 361/690 |
| 2004/0050606 A1 | * | 3/2004 | Yang et al. | 180/220 |

FOREIGN PATENT DOCUMENTS

JP         3949446 B2     4/2007

* cited by examiner

*Primary Examiner* — Joseph M Rocca
*Assistant Examiner* — Marc A Scharich
(74) *Attorney, Agent, or Firm* — Squire Patton Boggs (US) LLP (57) ABSTRACT

A battery holder for containing a battery unit is provided above a driving motor body and below a main frame. The battery holder includes a holder body portion, a plate member which is detachable from the holder body portion at a lateral side of a vehicle and by which lateral movement of the battery unit is restrained, and a terminal part which is provided at a rear portion of the holder body portion and is used for connecting a power supply from the battery unit to the driving motor body. The battery unit and the terminal part are detachably connected to each other. A controller fixing part by which a controller for controlling the power supply between the battery unit and the driving motor body is fixed to the vehicle, is provided at a lower portion of the holder body portion.

20 Claims, 12 Drawing Sheets

ELECTRICAL UNIT CONTAINING STRUCTURE FOR SADDLE TYPE ELECTRIC VEHICLE

BACKGROUND

1. Field

The present invention relates to an electrical unit containing structure for a saddle type electric vehicle.

2. Description of Related Art

Patent Document 1 (Japanese Patent No. 3949446) discloses a structure in a saddle type electric vehicle provided with a pair of left and right main frames, wherein a battery is mounted into a space between the main frames from a lateral side and is supported by the main frames.

In the structure according to Patent Document 1, the battery is mounted from a lateral side. In such kind of saddle type electric vehicle, a further improvement in mountability of the battery based on the assumption that the battery is to be attached and detached is demanded.

In addition, in the structure of Patent Document 1, a controller for controlling a motor is located farther than the battery from the motor, so that there is a problem as to shortening of a power supply line from the controller to the motor.

SUMMARY

The present invention has been made in consideration of the above-mentioned circumstances.

Accordingly, it is an object of the present invention to provide an electrical unit containing structure for a saddle type electric vehicle such that detachment of a battery can be facilitated and a power supply line to a driving motor can be shortened as much as possible.

In certain embodiments, the invention provides an electrical unit containing structure for a saddle type electric vehicle having a driving motor disposed under a rear portion of a frame extending toward a vehicle rear side from a head pipe. A battery can be disposed between the frame and the driving motor. A battery holder in which to contain the battery is provided above the driving motor and below the frame; the battery holder can include a holder body portion in which the battery is contained and held, a plate member which is detachable from the holder body portion to a vehicle lateral side and by which lateral movement of the battery is restrained, and a terminal part which is provided at a rear part of the holder body portion and is used for connection for power supply from the battery to the driving motor. The battery and the terminal part can be in a fitting structure wherein the battery and the terminal part are detachably connected to each other. A controller fixing part by which a controller for control of power supply between the battery and the driving motor is fixed is provided at a lower portion of the holder body portion. The controller fixing part can be disposed forwardly of the driving motor and below the battery.

According to another embodiment of the invention, the battery holder can include a lattice-like frame body.

According to another embodiment of the invention, the frame body constituting the battery holder can be provided with a holding plate for mounting electrical units.

According to other embodiments of the invention, an accelerator position sensor is provided on the frame on an upper side of the battery holder.

According to other embodiments of the invention, an electrical unit case which is modeled after a fuel tank and which covers the accelerator position sensor is provided on the frame on an upper side of the battery holder.

According to other embodiments of the invention, a main switch is provided at a position which is on a lower rear side of the head pipe, under the frame and forwardly of the battery holder.

According to other embodiments of the invention, a side cowl is provided to cover at least a part of left and right side surfaces of the electrical unit case, and the side cowl covers at least a part of the main switch from a lateral side.

According to certain embodiments, detachment of the battery can be facilitated. Furthermore, since the battery and the controller can be contained and disposed in such a manner that the battery, the controller and the driving motor are arranged in this order from the upper side of the vehicle, the power supply line from the controller to the driving motor can be shortened as much as possible.

In certain embodiments, an airflow induced by the traveling of the vehicle is made to impinge directly on the battery, whereby the battery can be cooled effectively.

In certain embodiments, electrical units can be disposed concentratedly on the frame body constituting the battery holder. Therefore, it is unnecessary to provide holding parts for exclusive use for locking connectors or couplers, individually in various places of the vehicle body. Accordingly, reductions in the number of component parts and in cost can be contrived.

According to certain embodiments, the electrical units are disposed concentratedly in the vicinity of the battery, whereby shortening of harnesses can be achieved.

In certain embodiments, the following effect can be obtained. In a saddle type vehicle with an internal combustion engine mounted thereon, a fuel tank generally disposed rearwardly of a head pipe and supported by a frame extending rearward from the head pipe enables the knee-grip by the rider. In view of this, the electrical unit case to be located rearwardly of the head pipe is modeled after a fuel tank in shape, whereby a configuration in which the knee-grip is possible can be obtained. In addition, the accelerator position sensor is covered by the electrical unit case, whereby the need for a protective member for exclusive use is eliminated, and reductions in the number of component parts and in cost can be contrived.

According to certain embodiments, the main switch is disposed at a position which is surrounded by three members on the front, upper and rear sides thereof and which is difficulty accessible, whereby the main switch can be protected against an unguarded access due to a disturbance.

According to certain embodiments, the access to the main switch is made more difficult, whereby the performance of protection of the main switch against an unguarded access due to a disturbance can be further enhanced.

DETAILED DESCRIPTION

Now, an embodiment of the present invention will be described below, based on the drawings. Incidentally, in the drawings used below, arrow FR indicates the front side of the vehicle, arrow UP indicates the upper side of the vehicle, and arrow LH indicates the left side of the vehicle.

Figure 1:
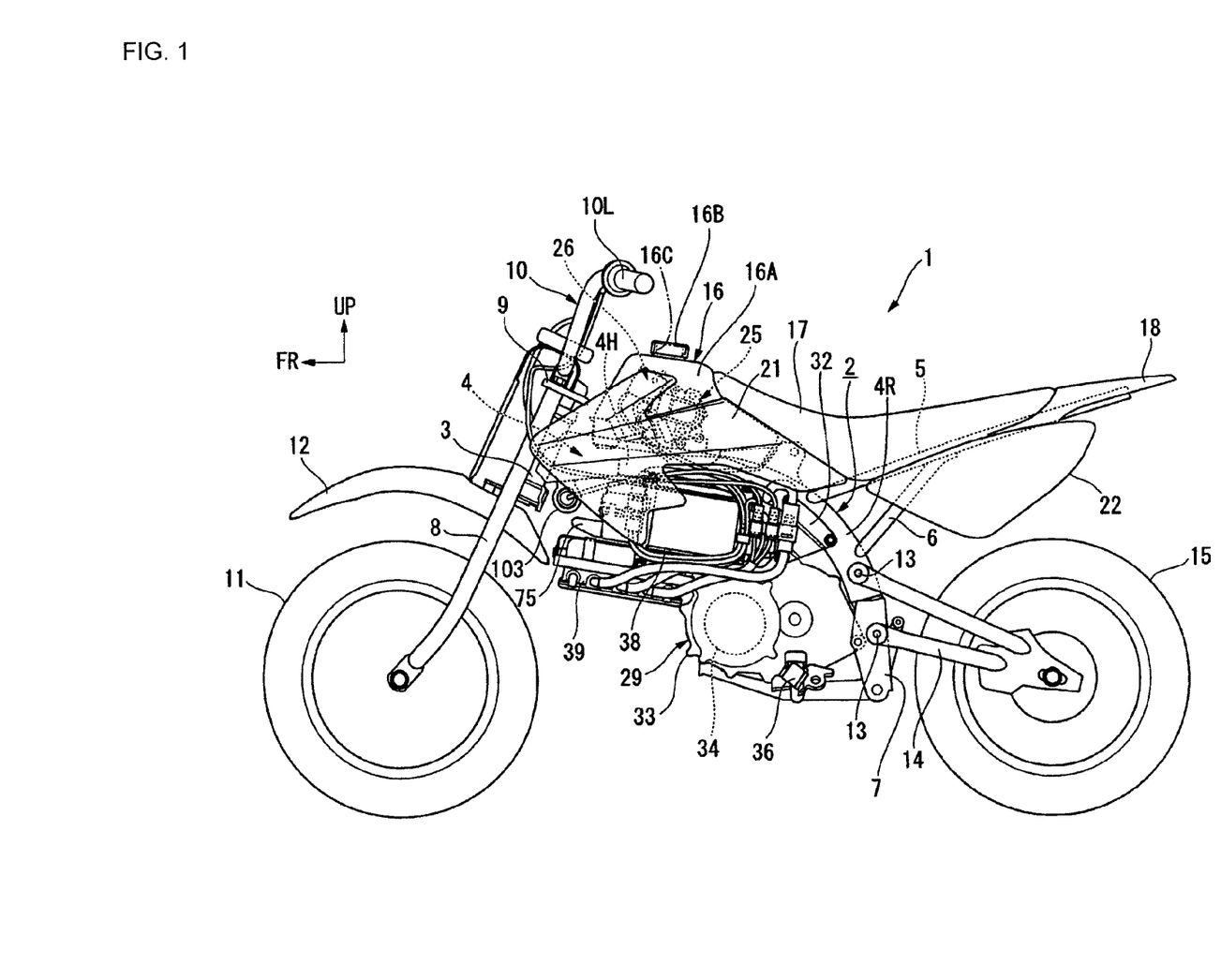
FIG. 1 is a left side view of a saddle type electric vehicle according to an embodiment of the present invention.
Figure 2:
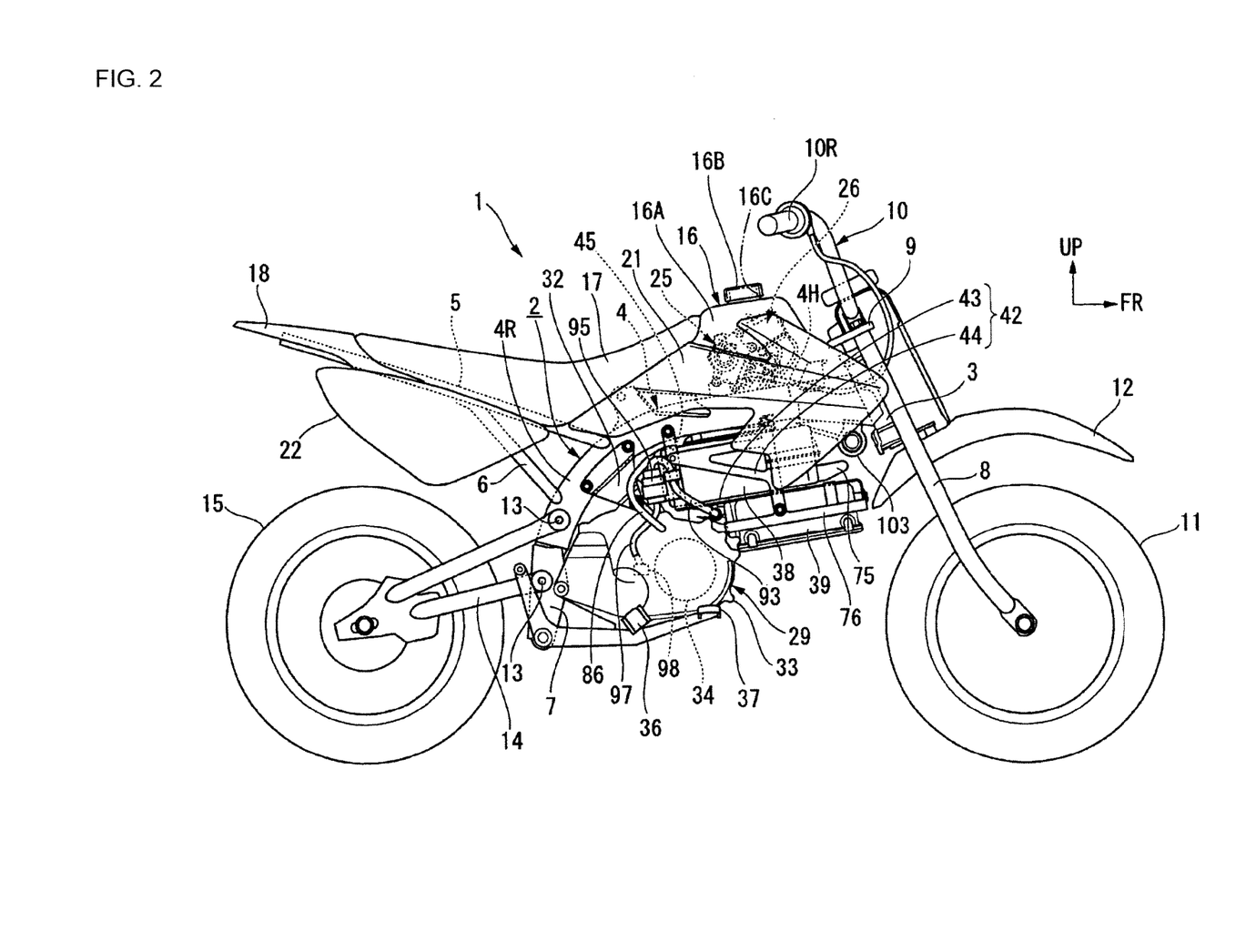
FIG. 2 is a right side view of the saddle type electric vehicle.
Figure 3:
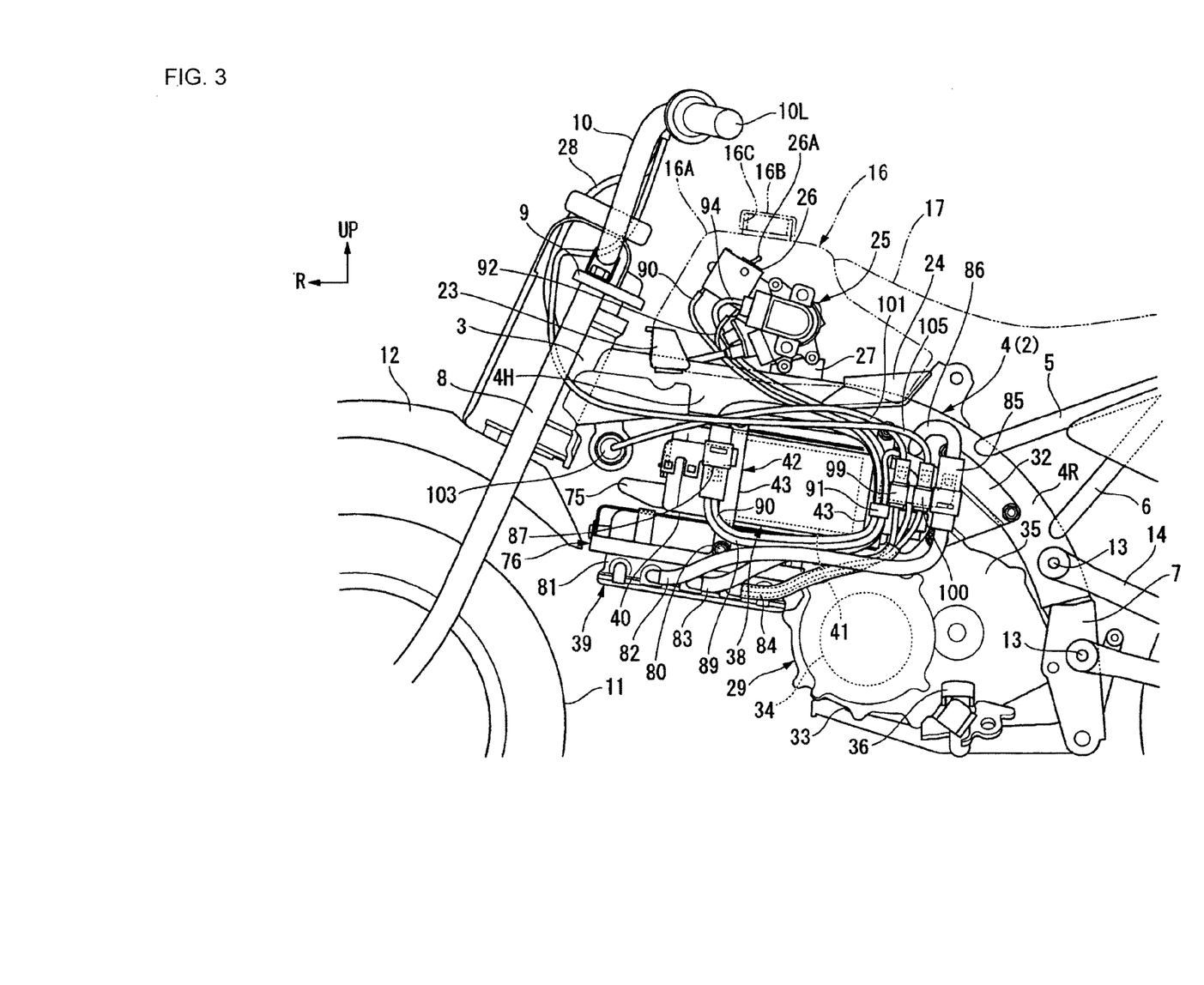
FIG. 3 is a left side view of a major part of the saddle type electric vehicle.

As shown in FIGS. 1 to 3, the saddle type electric vehicle 1 (hereinafter "vehicle 1") to which a structure according to this embodiment is applied, is configured as a comparatively small-type off-road motorcycle.

A body frame 2 of the vehicle 1 has a main frame 4 which integrally includes a horizontal region 4H extending toward the vehicle rear side in a roughly horizontal state from a head pipe 3, and a curved region 4R extending downward in a curved form from the rear end of the horizontal region 4H. A pair of left and right seat rails 5, 5 extending rearwardly upward is connected to portions near a starting point of the curved region 4R of the main frame 4. A pair of left and right support frames 6, 6 by which a rear portion of the curved region 4R of the main frame 4 and fore-and-aft-directionally roughly central portions of the seat rails 5, 5 are interconnected is disposed under the seat rails 5, 5. In addition, a pair of left and right plates 7, 7 extending downward is connected to lower portions of the main frame 4.

Figure 4:
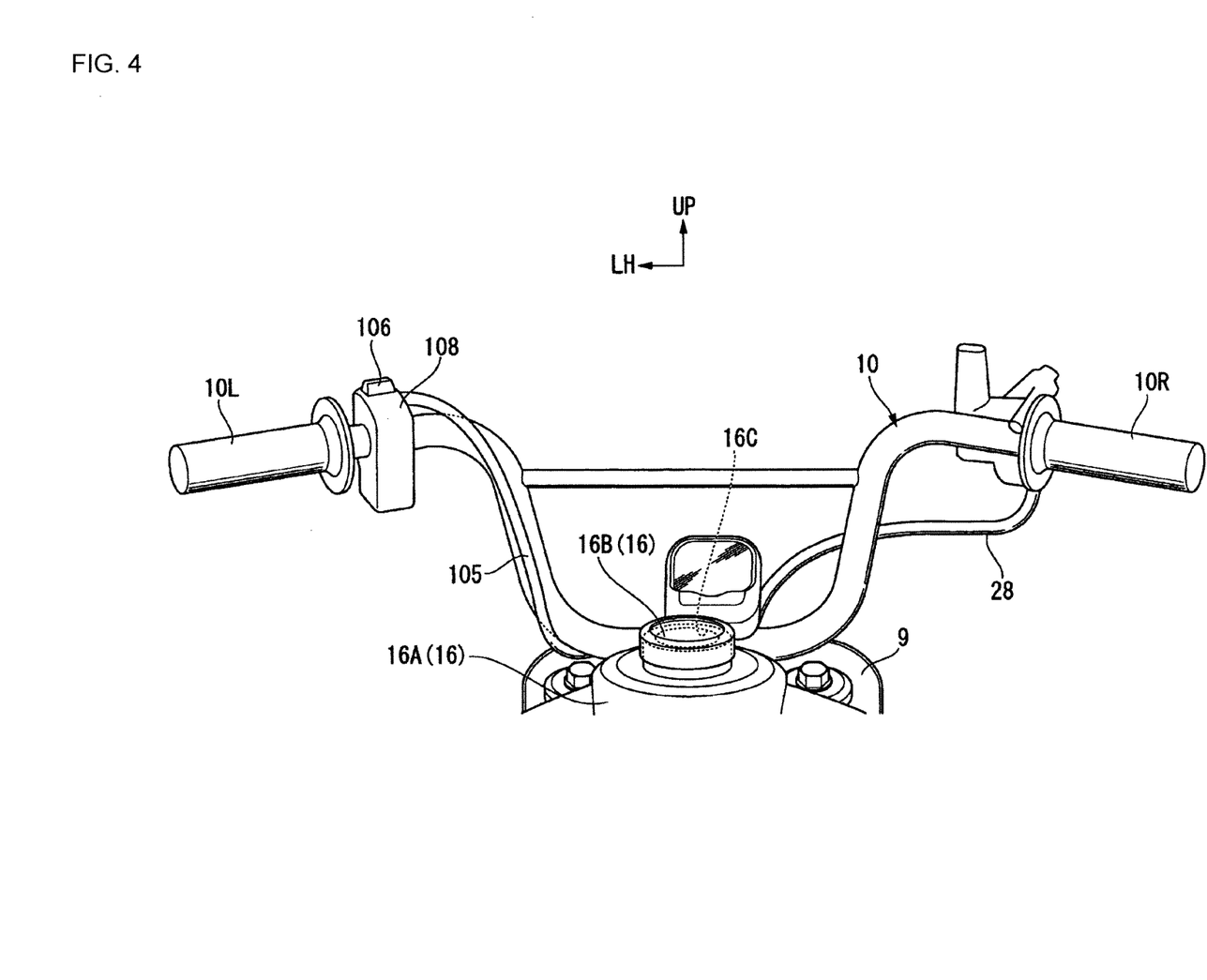
FIG. 4 is a rear view of a handle in the saddle type electric vehicle.

A pair of left and right front fork members 8, is steerably supported on the head pipe 3, and a bar handle 10 is fixed to a top bridge 9 by which upper portions of the front fork members 8, 8 are interconnected. Referring to FIG. 4, a hollow cylindrical left grip 10L is mounted to a left-side end portion of the bar handle 10, and a hollow cylindrical accelerator grip 10R which is rotatable about an axis is mounted to a right-side end portion of the bar handle 10.

A front wheel 11 is rotatably supported on lower portions of the front fork members 8, 8, and a resin-made front fender 12 for covering the upper side of the front wheel 11 is fixed to portions, between the front wheel 11 and the bar handle 10, of the front fork members 8, 8. Besides, the front ends of a pair of left and right rear arms 14, 14 are fixed to the plates 7, 7 through a pair of upper and lower shaft portions 13, 13, and a rear wheel 15 is rotatably supported on rear portions of the rear frames 14, 14.

An electrical unit case 16, modeled in this example after a fuel tank of a motorcycle, is disposed on the upper side of the horizontal region 4H of the main frame 4. The electrical unit case 16 is so located as to extend in the fore-and-aft direction along the main frame 4. A seat 17 which is fixed to upper portions of the seat rails 5, 5 and on which to seat a rider is disposed rearwardly of the electrical unit case 16. The seat 17 extends in the fore-and-aft direction of the vehicle, and its front portion is laid onto a rear portion of the electrical unit case 16 from above. In addition, a resin-made rear fender 18 can be fixed rearwardly of the seat 17 so as to extend rearward.

The electrical unit case 16 can include a case body 16A and a cap 16B. An opening part 16C opening while projecting upward is formed at an upper portion of the case body 16A, and the cap 16B is attached to the opening part 16C in an openable and closable manner. The electrical unit case 16 has its left and right side portions covered by side cowls 21, 21. A pair of left and right rear cowls 22, 22 is provided under a rear portion of the seat 17. The rear cowls 22, 22 are fixed to the seat rails 5, 5, and cover a part of the support frames 6, 6.

As shown in FIG. 3, a front-side bracket 23 is welded to front-side upper portions of the horizontal region 4H of the main frame 4, and a rear-side bracket 24 is welded to rear portions of the horizontal region 4H. The electrical unit case 16 is fixed to the brackets 23 and 24. Here, in this vehicle 1, the electrical unit case 16 is modeled after a fuel tank in shape, so that the electrical unit case 16 can be gripped by the knees of the rider seated on the seat 17.

The accelerator position sensor 25 and the breaker 26 are disposed inside the electrical unit case 16. The accelerator position sensor 25 is fixed to a sensor bracket 27 which is welded to the horizontal region 4H of the main frame 4 and protrudes upward. The breaker 26 is fixed to a front-side upper portion of the accelerator position sensor 25.

Figure 5:
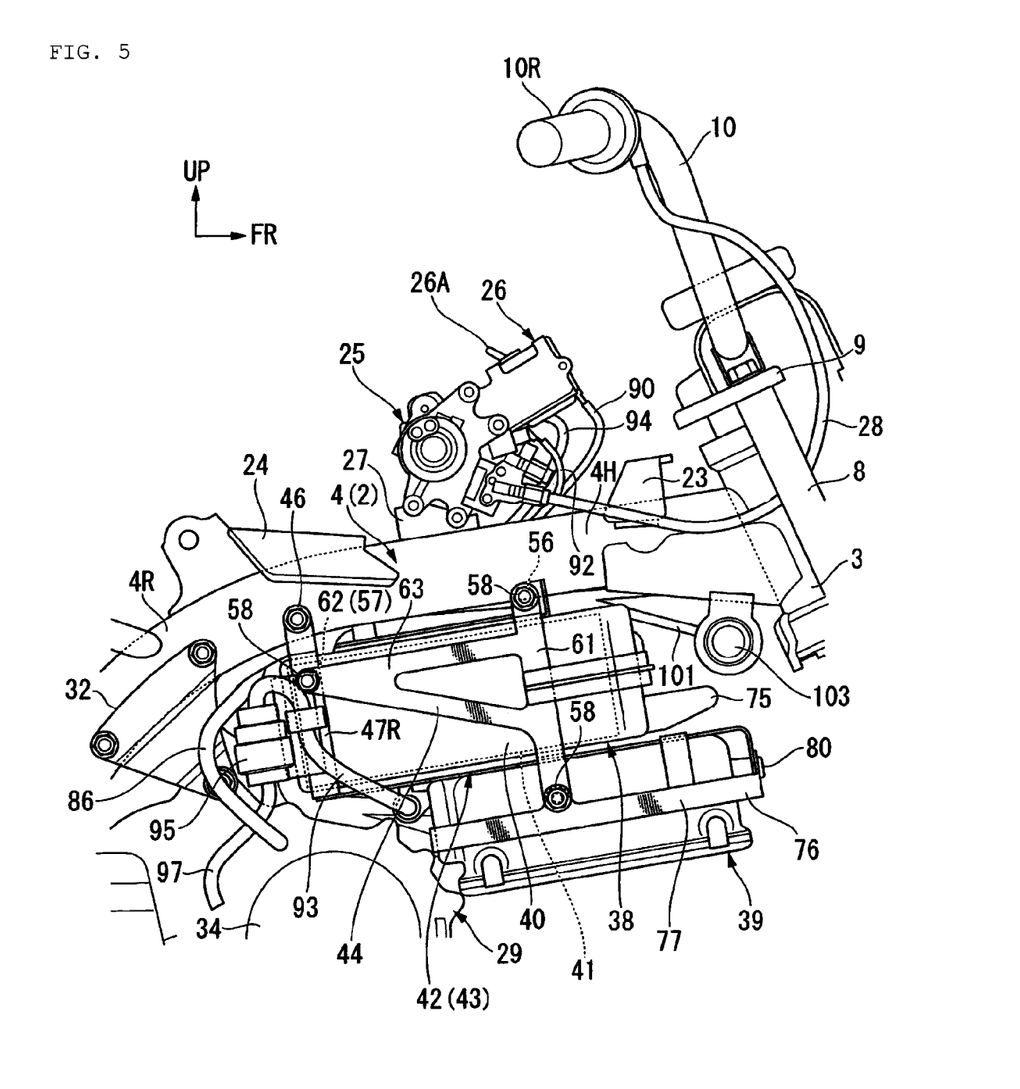
FIG. 5 is a right side view of a major part of the saddle type electric vehicle.

As shown in FIG. 5, one end of a throttle cable is connected to the accelerator position sensor 25, and the other end of the throttle cable 28 is connected to the accelerator grip 10R. The accelerator position sensor 25 detects the rotational operating amount of the accelerator grip 10R through the throttle cable 28. Based on the rotational operating amount thus detected, an output of a motor unit 29 disposed under a rear portion of the horizontal region 4H of the main frame 4 is controlled.

The breaker 26 is located under the opening part 16C of the electrical unit case 16, is provided at an upper portion thereof with a change-over switch 26A which can be swung in the fore-and-aft direction, and is so disposed that the change-over switch 26A is located beneath and close to the opening part 16C. This ensures that when the cap 16B is detached from the electrical unit case 16, the breaker 26 can be operated by the driver.

Referring to FIGS. 3 and 5, a pair of left and right plate-shaped suspension brackets 32, 32 is fastened to an upper portion of the curved region 4R of the main frame 4. A motor unit 29 has its upper portion fixed to the suspension brackets 32, 32, and has its rear portion fixed to front portions of the plates 7, 7, whereby it is suspended on the main frame 4. As shown in FIGS. 1 and 2, the motor unit 29 is so configured as to have a driving motor body 34 contained on the front side in the unit case 33 and have a decelerator (not shown) contained on the rear side in the unit case 33. In addition, left and right steps 36, 36 are mounted to lower portions of the unit case 33.

A battery unit 38 is disposed between the main frame 4 and the motor unit 29 (the driving motor body 34) in the vertical direction of the vehicle, and a controller 39 for controlling power supply to the driving motor body 34 of the motor unit 29 is disposed under the battery unit 38.

Referring to FIGS. 3 and 5, the battery unit 38 has a configuration wherein a battery 41 composed of a plurality of lithium secondary cells is contained in a battery case 40 which is rectangular in shape in side view and of which the longitudinal direction is set along the fore-and-aft direction of the vehicle. Electric power of the battery 41 is supplied to the motor unit 29 through the controller 39. Incidentally, reference numeral 75 in the figures denotes a handle to be gripped by the user.

Figure 6:
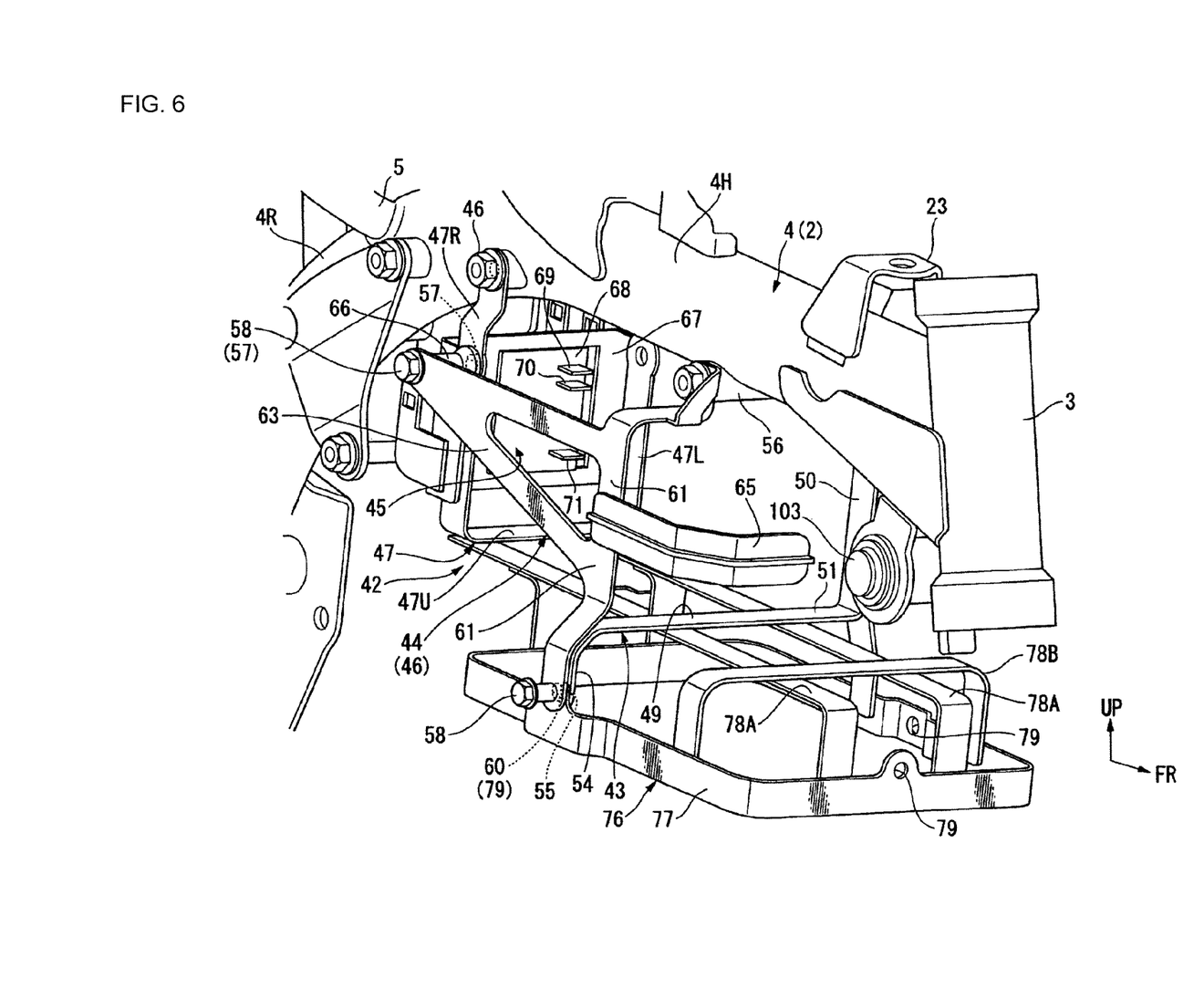
FIG. 6 is a perspective view, as viewed from a right front side, of a battery holder in the saddle type electric vehicle.
Figure 7:
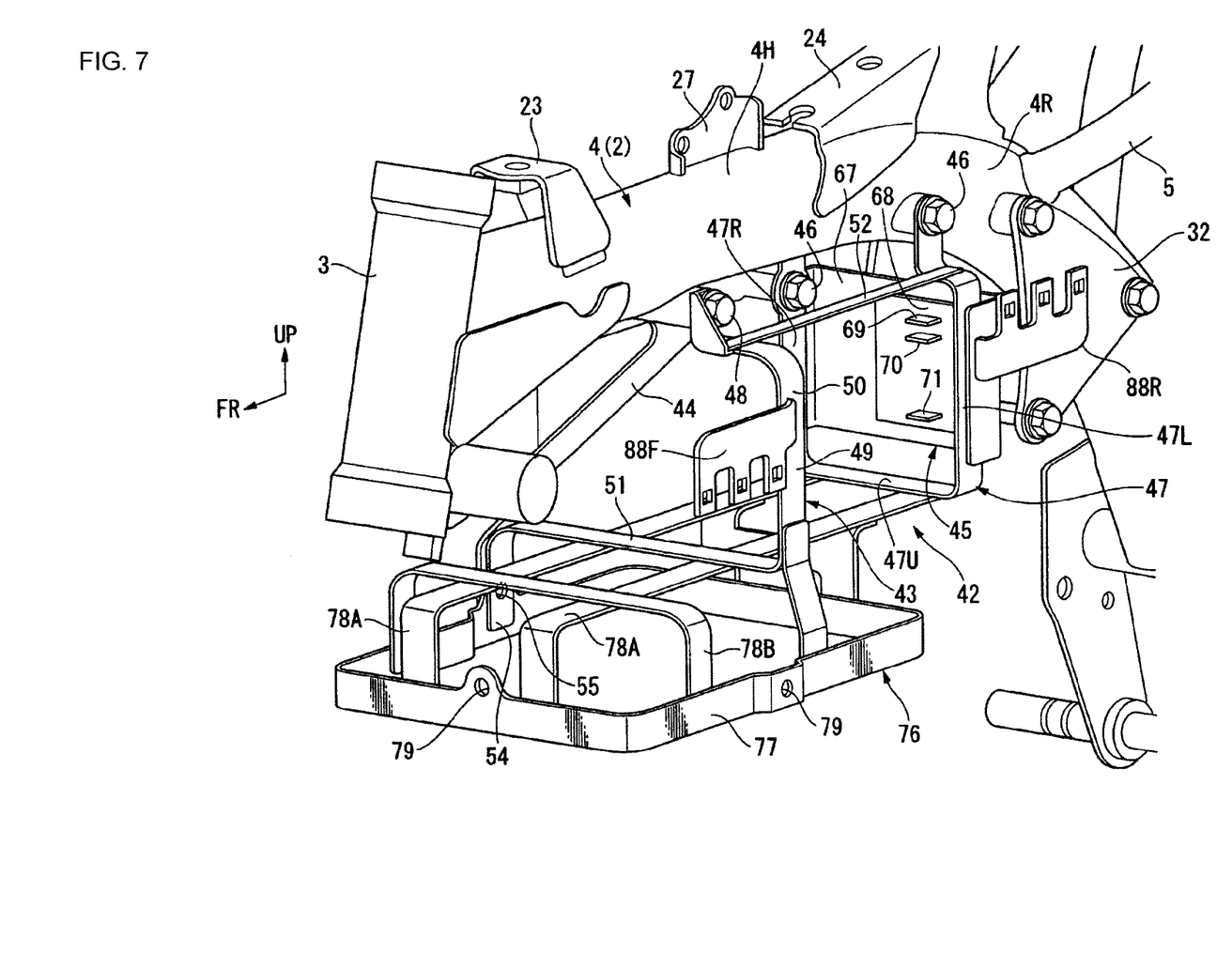
FIG. 7 is a perspective view, as viewed from a left front side, of the battery holder in the saddle type electric vehicle.

The battery unit 38 is contained in a battery holder 42 suspended on the horizontal region 4H of the main frame 4. Referring to FIGS. 6 and 7, the battery holder 42 includes: a holder body portion 43 for containing and holding the battery unit 38; a plate member 44 which can be detached from the holder body portion 43 to the vehicle right side and which restrains lateral movement of the battery unit 38; and a terminal part 45 which is provided at a rear part of the holder body portion 43 and is used for connection for power supply from the battery unit 38 to the motor unit 29.

Referring to FIGS. 6 and 7, the holder body portion 43 can include a lattice-like frame body. The holder body portion 43 includes a roughly U-shaped rear-side frame portion 47 of which both end parts are fastened and fixed to left and right parts of a rear portion of the horizontal region 4H of the main frame 4 by bolts 46, 46, and a front-side frame portion 49 of which one end is fastened and fixed to a left side surface of a fore-and-aft-directionally roughly central portion of the horizontal region 4H of the main frame 4 by a bolt 48 and which extends downward. The front-side frame portion 49 is formed in an L-shape such as to extend downward and then to be bent into a horizontal direction and extend rightward.

The rear-side frame portion 47 has a structure wherein a bottom portion 47U interconnecting left and right downwardly extending parts 47L and 47R extending downward from the main frame 4 is set along a roughly horizontal direction, to provide a surface on which to mount the battery unit 38. The front-side frame portion 49 has a structure wherein a bottom portion 51 bent from the lower end of a downwardly extending part 50 extending downward from the main frame 4 is set along a roughly horizontal direction, to provide a surface on which to mount the battery unit 38. The battery unit 38 is supported on these mounting surfaces. In addition, a reinforcement plate 52 extending in a fore-and-aft direction is spanningly disposed between the downwardly extending part 47L of the rear-side frame portion 47 and an upper portion of the downwardly extending part 50 of the front-side frame portion 49.

Of the front-side frame portion 49, a right end part of the bottom portion 51 is bent downward to form a downwardly bent part 54. The downwardly bent part 54 is formed with a lower fastening hole 55, which is a threaded hole. Besides, referring to FIGS. 5 and 6 together, an upper-side boss portion 56 having a threaded inner circumference is provided at a right side surface of a fore-and-aft-directionally roughly central portion of the horizontal region 4H of the main frame 4. A rear fastening hole 57 which is a threaded hole is formed at an upper portion of the downwardly extending part 47R of the rear-side frame portion 47.

Figure 8:
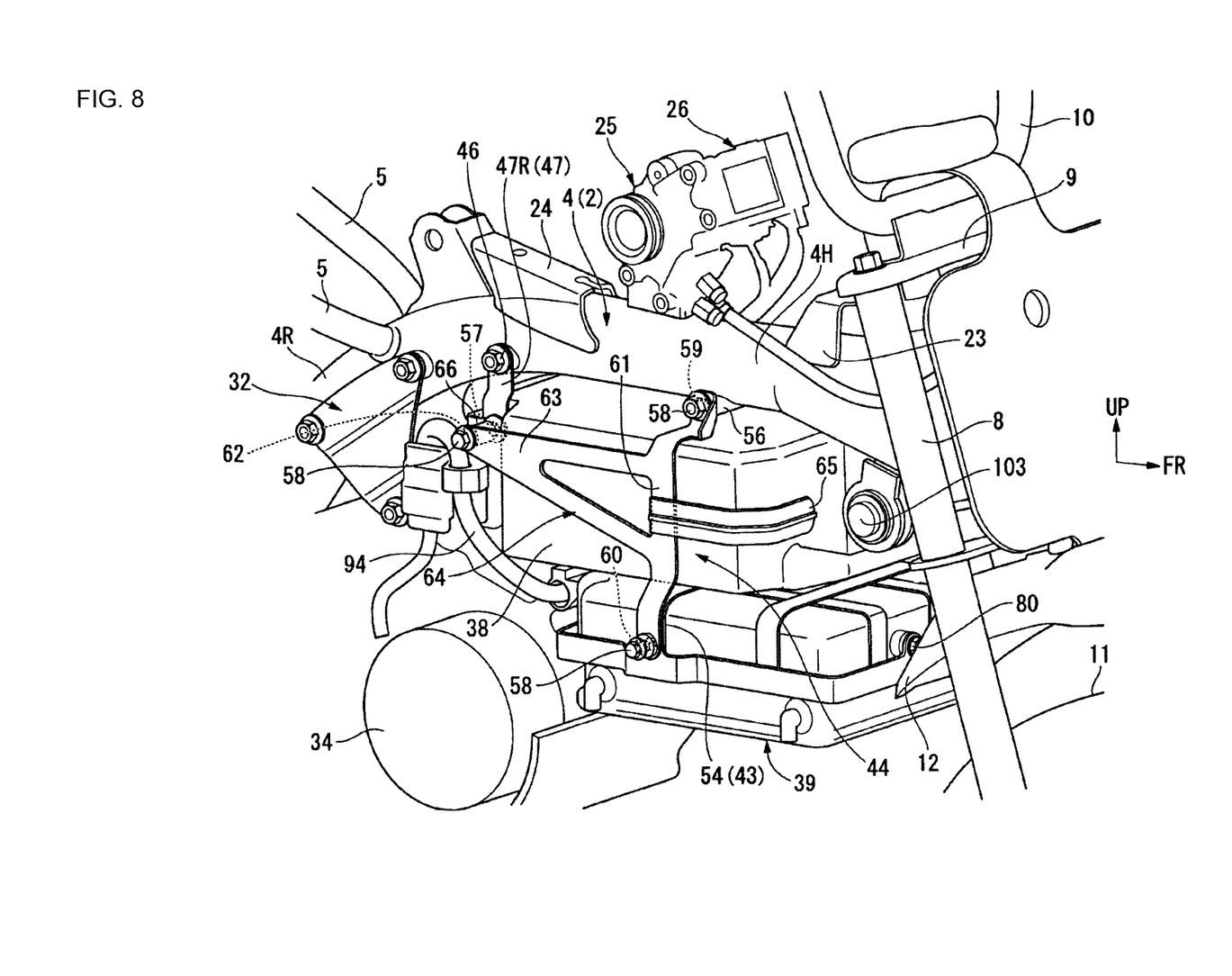
FIG. 8 is a perspective view, as viewed from a right front side, of a state in which a battery unit is contained in the battery holder.
Figure 9:
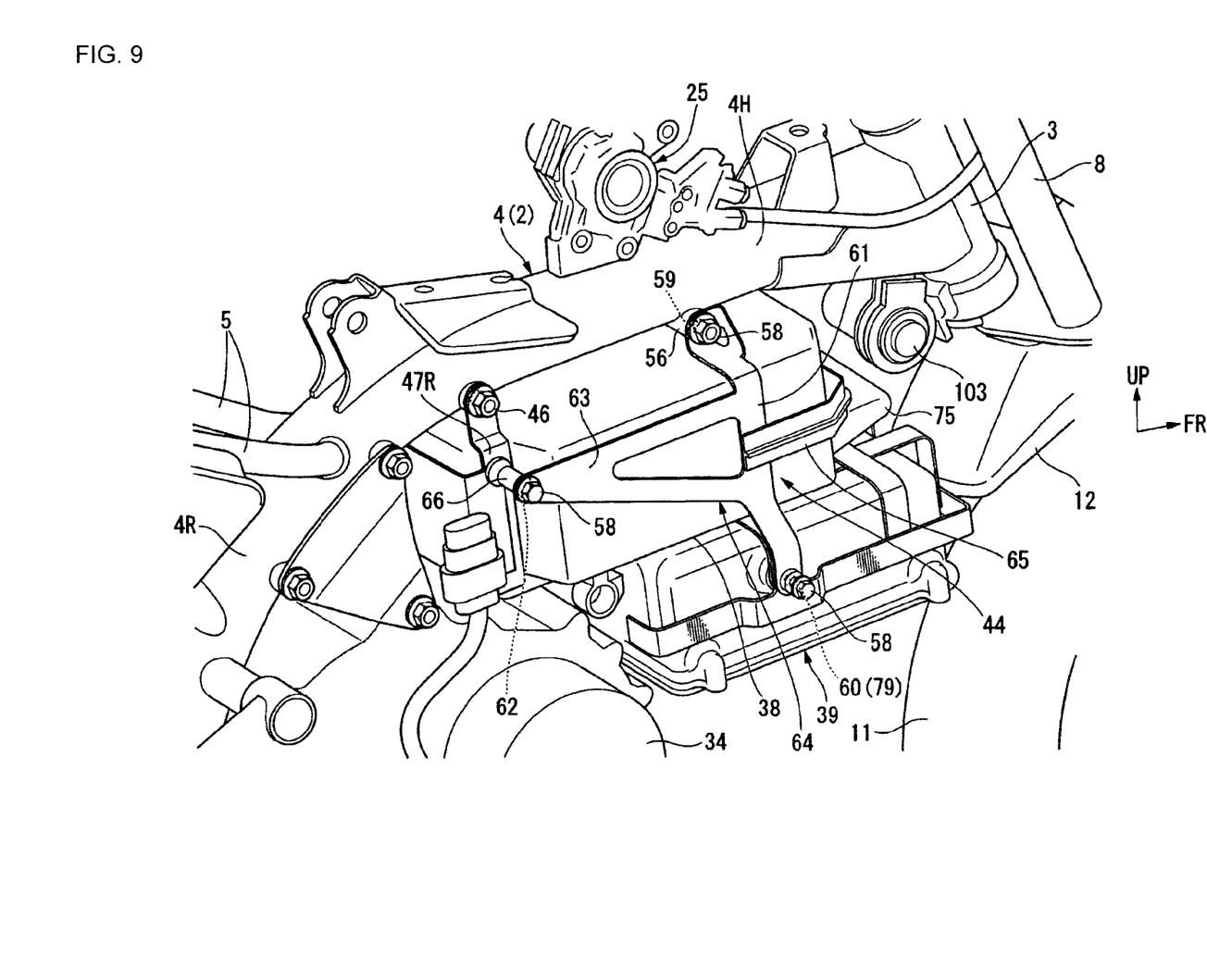
FIG. 9 is a perspective view, as viewed from a right rear side, of a state in which the battery unit is contained in the battery holder.

The plate member 44 is formed of sheet metal material, and is fixed to the holder body portion 43 by inserting bolts 58 . . . at three locations, namely, through the lower fastening hole 55, the upper-side boss portion 56, and the rear fastening hole 57. Referring to FIGS. 8 and 9 also, the plate member 44 has a plate body 64 having, integrally formed, a vertically extending part 61 which is provided in its upper and lower end portions with upper and lower insertion holes 59 and 60 for bolts 58, and a rearwardly extending part 63 which extends rearward from the vertically extending part 61 and is formed at its rear end with an insertion hole 62 for a bolt 58. A movement restraining part 65 protruding forward and making contact with the front surface of the battery unit 38 is welded to the vertically extending part 61.

The plate body 64 makes contact with the right side surface of the battery unit 38, thereby restraining rightward movement of the battery unit 38. The rearwardly extending part 63 of the plate body 64 is fastened to the downwardly extending part 47R, with a collar 66 therebetween. The rearwardly extending part 63 is formed in a triangular shape with an acute angle on the rear side, in side view, and is provided with an inside cutout for lightening.

Referring to FIGS. 6 and 7, the terminal part includes a plate-shaped base portion 67 spanningly disposed between the downwardly extending parts 47L and 47R of the rear-side frame portion 47, and a terminal mount 68 fixed to the front surface side of the plate-shaped base portion 67. A positive electrode terminal 69, a negative electrode terminal 70, and an information transfer terminal 71 are provided on the terminal mount 68, in the state of projecting forward and being arranged in this order from the upper side.

Figure 10:
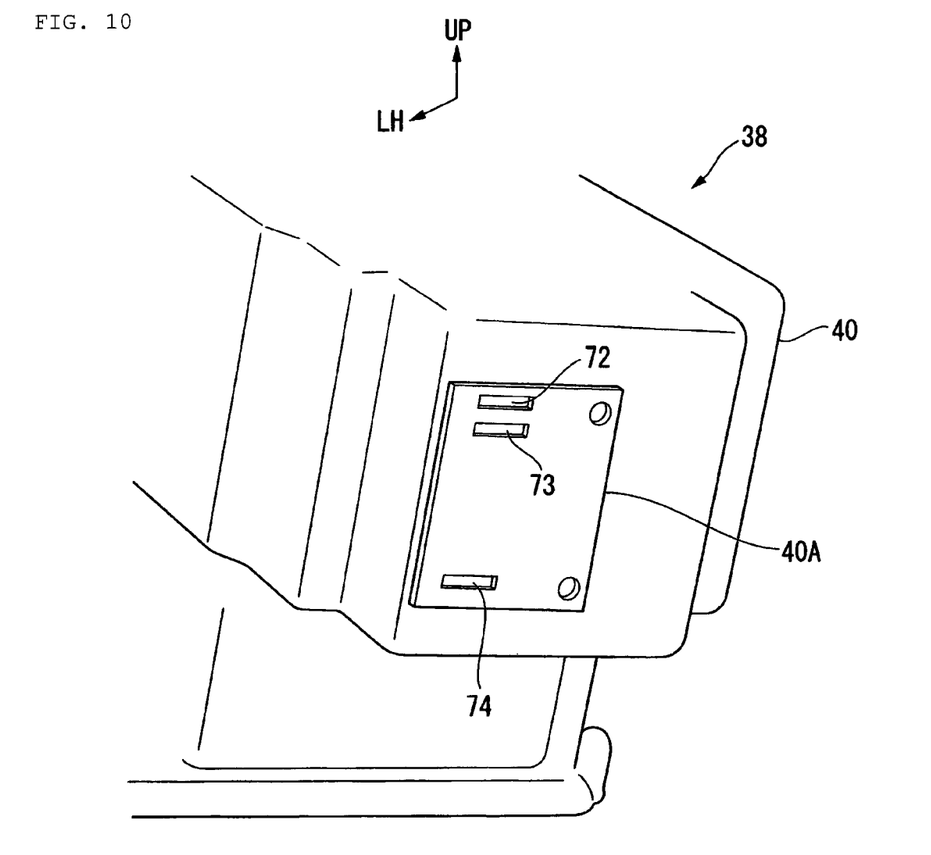
FIG. 10 is a perspective view of a rear portion of the battery unit.

The battery unit 38 and the terminal part 45 are in a fitting structure wherein they are detachably connected to each other. As shown in FIG. 10, the battery unit 38 is provided at its rear portion with a plate member 40A projecting rearward, and the plate member 40A is formed with a positive electrode terminal fitting hole 72, a negative electrode terminal fitting hole 73, and an information transfer terminal fitting hole 74 in this order from the upper side. The positive electrode terminal 69, the negative electrode terminal 70, and the information transfer terminal 71 are connected to the positive electrode terminal fitting hole 72, the negative electrode terminal fitting hole 73, and the information transfer terminal fitting hole 74, whereby electric power is supplied from the battery unit 38 to the motor unit 29.

Figure 11:
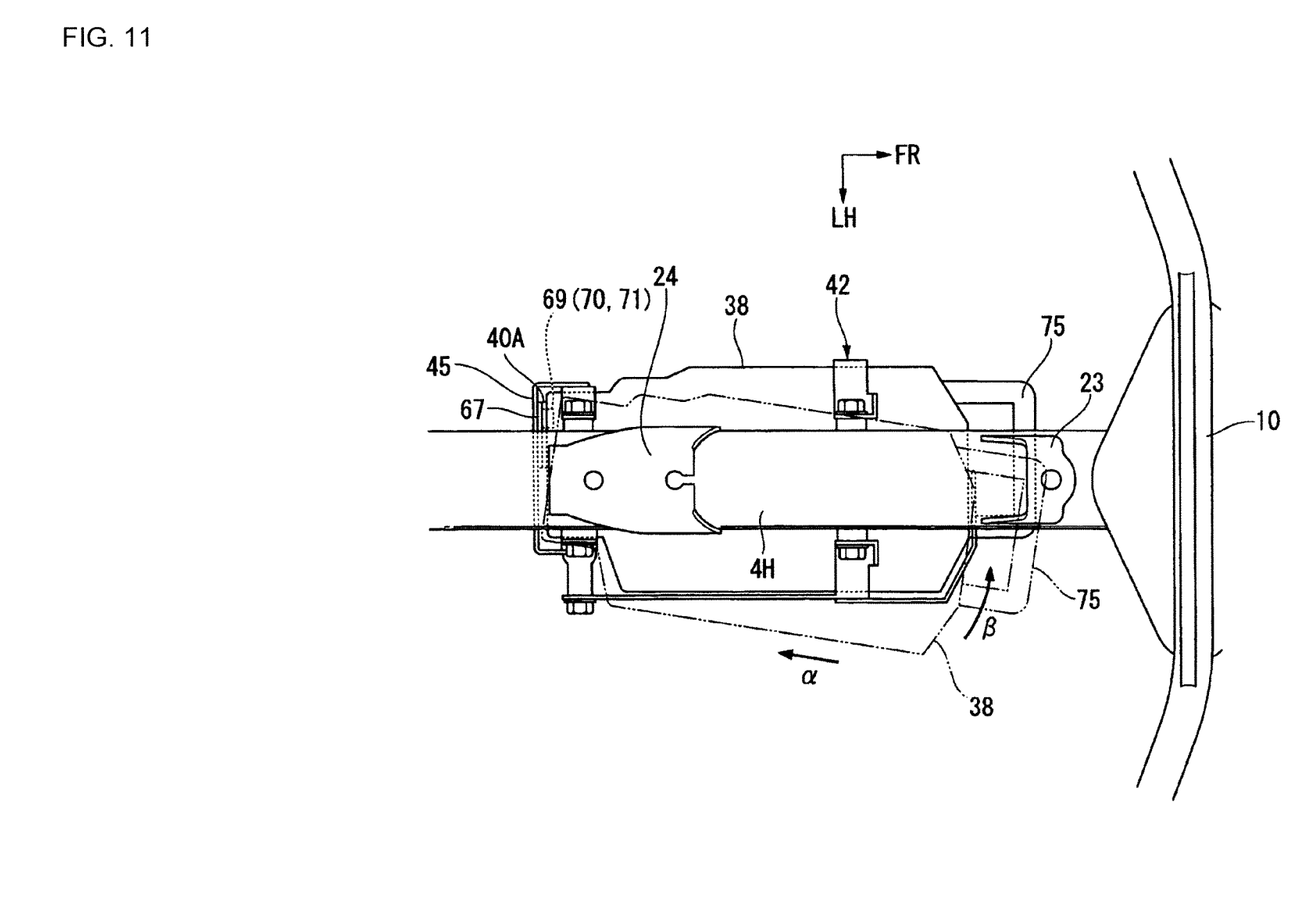
FIG. 11 is a view for illustrating an operation at the time of containing the battery unit into the battery holder.

The widths of the terminals 69 to 71 are so set that a clearance is generated in the fitting state between the fitting holes 72 to 74 and the terminals 69 to 71. This ensures that at the time of containing the battery unit 38 into the battery holder 42, first, as indicated by arrow α in FIG. 11, the battery unit 38 is inserted into the battery holder 42 obliquely relative to the terminals 69 to 71, and, in this oblique state, the fitting holes 72 to 74 can be engaged with the terminals 69 to 71. Then, starting from this state, the battery unit 38 can be contained into the battery holder 42 in the manner of turning the battery unit 38, with the position of the terminals 69 to 71 as a center axis of turning, as indicated by arrow β.

Referring to FIG. 5, a controller fixing part 76 formed of sheet metal material is welded to a lower portion of the battery holder 42, and the controller 39 is fixedly supported by the controller fixing part 76. The controller fixing part 76 fixes the controller 39 in such a manner that the controller 39 is located forwardly of the motor unit 29 (the driving motor body 34) and below the battery unit 38. The controller fixing part 76 is provided at a position, nearer to the front end than to the rear end, of a lower portion of the battery holder 42. As shown in FIGS. 6 and 7, the controller fixing part 76 includes: a rectangular frame-like fixing part body 77; a pair of left and right L-shaped plate members 78A, 78A which extends in the fore-and-aft direction, is welded to the bottom portions 47U and 51 of the battery holder 42, and welded at their front portions to front portions of the fixing part body 77; and a roughly U-shaped plate member 78B which is welded to front-side upper portions of the plate members 78A, 78A and to front-side left and right side portions of the fixing part body 77. Such a controller fixing part 76 also is composed of a lattice-like frame body.

The fixing part body 77 is formed, in its left and right side portions and in its front portion, with bolt insertion holes 79 . . . for fastening and fixing the controller 39 (see FIGS. 6 and 7). As shown in FIGS. 3 and 5, bolts 80 are inserted in the bolt insertion holes 79, 79 in the left side portion and the front portion, of the above-mentioned bolt insertion holes 79. Besides, as shown in FIG. 9, the bolt 58 passed through the lower insertion hole 60 in the plate member 44 is inserted in the bolt insertion hole 79 formed in the right side portion of the fixing part body 77. These bolts are fastened to fastening holes (not shown) formed in the controller 39, whereby the controller 39 is fixed.

More in detail, the controller 39 is fixed to the controller fixing part 76, and is located on a front upper side relative to the driving motor body 34. As shown in FIG. 3, the controller 39 has electrical units such as a driver contained in a case 81. A downstream-side motor harness 82, a power supply harness 83 and a sensor harness 84 are connected, at positions arranged in this order from the front side, to the left side surface of the case 81. Here, the positional relations among the driving motor body 34 and the controller 39 and the battery unit 38 are as follows. The driving motor body 34 and the controller 39 are located so as to be aligned along a direction from the rear side toward a front upper side. The battery unit 38 is located on the upper side of the driving motor body 34 and the controller 39 in the manner of extending over the driving motor body 34 and the controller 39.

Figure 12:
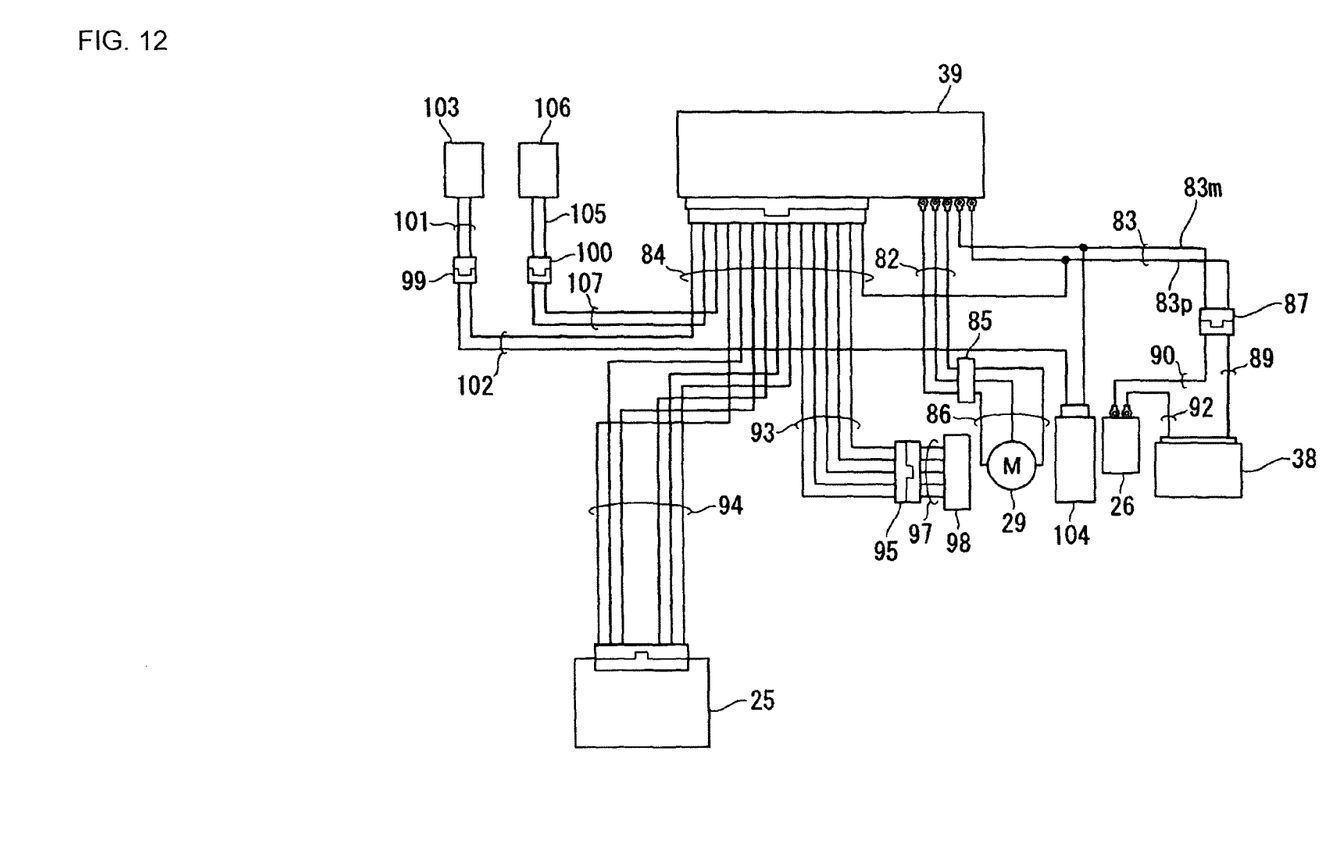
FIG. 12 is a wiring diagram for the saddle type electric vehicle.

FIG. 12 illustrates a wiring diagram for various harnesses in the vehicle 1. Laying of the various harnesses will be described below.

The downstream-side motor harness 82 is led out rearward from the controller 39, and is connected to a lower portion of a motor coupler 85. The motor coupler 85 is fixed to a rear portion side of a rear-side coupler holding plate 88R which is fixed to a downwardly extending part 47L of a rear-side frame portion 47, as shown in FIG. 7. The rear-side coupler holding plate 88R is provided with a coupler mounting part at each of a front portion, a rear portion, and a central portion between the front portion and the rear portion.

An upstream-side motor harness 86 connected to an upper portion of the motor coupler 85 is led out forward, is extended past a rear portion of the battery unit 38, and is connected to the driving motor body 34 via a right side surface of the motor unit 29, as shown in FIG. 2.

As shown in FIG. 12, the power supply harness includes an upstream-side negative electrode harness 83*m* and a downstream-side positive electrode harness 83*p*, which are led out rearward from the controller 39, as shown in FIG. 3. The power supply harness 83 is curved forward from the vicinity of a rear portion of the battery unit 38 in side view, and is connected to an upper portion of a power supply coupler 87. The power supply coupler 87 is fixed to a rear portion of a front-side coupler holding plate 88F which is fixed to a downwardly extending part 50 of a front-side frame portion 49, as shown in FIG. 7. The front-side coupler holding plate 88F is provided with a coupler mounting part at each of a front portion, a rear portion, and a central portion between the front portion and the rear portion.

A downstream-side negative electrode harness 89 and a downstream-side positive electrode harness 90 are connected to a lower portion of the power supply coupler 87, and pass currents to the upstream-side negative electrode harness 83*m* and the downstream-side positive electrode harness 83*p*, respectively. The downstream-side negative electrode harness 89 and the downstream-side positive electrode harness 90 are led out rearward. The downstream-side negative electrode harness 89 is led out to a rear portion of the battery unit 38, and passes a current to the battery unit 38. The downstream-side positive electrode harness 90 is curved upward, and is connected to the breaker 26. Here, the power supply harness 83, the downstream-side negative electrode harness 89, and the downstream-side positive electrode harness 90 are bundled with a clip 91.

Furthermore, referring to FIGS. 3 and 12, a breaker-side positive electrode harness 92 is connected to the breaker 26. This breaker-side positive electrode harness 92 is led out to a lower portion of the battery unit 38, and passes a current to the battery unit 38.

In addition, as shown in FIG. 12, the sensor harness 84 includes a plurality of harnesses, of which a rotation sensor harness 93 (refer to FIG. 5) extends from the controller 39 and across a rear portion of the battery unit 38, and is connected to an upper portion of the rotation sensor coupler 95 disposed rearwardly of the battery unit 38. A connection harness 97 is connected to a lower portion of the rotation sensor coupler 95. The connection harness 97 is connected via a right side surface of the motor unit 29 to a rotation sensor 98 contained in the inside of the motor unit 29, as shown in FIG. 2.

Besides, as shown in FIG. 3, an accelerator sensor harness 94 in the sensor harness 84 is led out rearward from the controller 39, is curved upward from the vicinity of a rear portion of the battery unit 38, and is connected to the accelerator position sensor 25.

Furthermore, as shown in FIG. 3, a main switch coupler 99 and a kill switch coupler 100 are fixed to the rear-side coupler holding plate 88R. Referring to FIG. 12, a first harness 101 and a second harness 102 are led out from the main switch coupler 99. The first harness 101 is connected to a main switch 103, whereas the second harness 102 is branched, to be connected to a fuse 104 and the controller 39. Referring to FIG. 5, the main switch 103 is fixed to a front end lower portion of the main frame 4.

Here, the main switch 103 is provided at a position which is on a lower rear side of the head pipe 3, under the main frame 4, and forwardly of the battery unit 38 and the battery holder 42. Furthermore, referring to FIG. 2, the main switch 103 has at least a part thereof covered with the side cowls 21, 21 from lateral sides.

On the other hand, a third harness 105 led out from the kill switch coupler 100 is connected to a kill switch 106, and a fourth harness 107 to the controller 39. Referring to FIG. 4, the kill switch 106 is provided at a switch box 108 which is disposed proximate to the left grip 10L of the bar handle 10.

As has been described above, in the saddle type electric vehicle 1, the driving motor body 34 is disposed under a rear portion of the main frame 4 (strictly speaking, the horizontal region 4H) extending toward the vehicle rear side from the head pipe 3, and the battery unit 38 is disposed between the main frame 4 and the driving motor body 34. In addition, the battery holder 42 is provided above the driving motor body 34 and below the main frame 4, and the battery unit 38 is contained in the battery holder 42.

Besides, the battery holder 42 includes the holder body portion 43 in which to contain and hold the battery unit 38, the plate member 44 which can be detached from the holder body portion 43 to a lateral side of the vehicle and which restrains lateral movement of the battery unit 38, and the terminal part 45 which is provided at a rear portion of the holder body portion 43 and is used for connection for power supply from the battery unit 38 to the driving motor body 34. The battery unit 38 and the terminal part 45 are in a fitting structure wherein they are detachably connected to each other. In addition, the controller fixing part 76 for fixing the controller 39 which performs control of power supply between the battery unit 38 and the driving motor body 34 is provided at a lower part of the holder body portion 43. The controller fixing part 76 is disposed forwardly of the driving motor body 34 and below the battery unit 38.

In the structure according to the present embodiment as described above, the battery unit 38 and the terminal part 45 are in the fitting structure wherein they are detachably interconnected, whereby detachment of the battery unit 38 can be facilitated. Furthermore, the battery unit 38 and the controller 39 can be contained and laid out in such a manner that the battery unit 38, the controller 39 and the driving motor body 34 are aligned in this order from the upper side of the vehicle, so that the power supply line from the controller 39 to the driving motor body 34 can be shortened as much as possible. Besides, since the battery unit 38 and the controller 39 are laid out nearer to the front end than to the rear end of the vehicle, weight balance can be improved.

While an embodiment of the present invention has been described above, the invention is not limited to the above embodiment, and modifications can be appropriately made within the scope of the gist of the invention. For instance, the shape of the main frame 4 may be such a shape that the main frame 4 extends roughly rectilinearly from the head pipe 3 toward an obliquely rear lower side.

Description of Reference Numerals
1 Saddle type electric vehicle
3 Head pipe
4 Main frame (frame)
34 Driving motor body (driving motor)
38 Battery unit (battery)
39 Controller (control device)
42 Battery holder
43 Holder body portion
44 Plate member
45 Terminal part
76 Controller fixing part

The invention claimed is:

1. An electrical unit containing structure for a saddle type electric vehicle having a driving motor disposed under a rear portion of a frame extending toward a rear of the vehicle from a head pipe, and a battery disposed between the frame and the driving motor,
wherein a battery holder configured to contain the battery is provided above the driving motor and below the frame,
wherein the battery holder includes a holder body portion in which the battery is contained and held, a plate member which is detachable from the holder body portion at a lateral side of the vehicle and by which lateral movement of the battery is restrained, and a terminal part which is provided at a rear part of the holder body portion and is used for connecting a power supply from the battery to the driving motor,
wherein the battery and the terminal part are detachably connected to each other,
wherein a controller fixing part, by which a controller for controlling the power supply between the battery and the driving motor is fixed to the vehicle, is provided at a lower portion of the holder body portion, and
wherein the controller fixing part is disposed forwardly of the driving motor and below the battery.

2. The electrical unit containing structure according to claim 1, wherein the battery holder is comprised of a lattice frame body.

3. The electrical unit containing structure according to claim 2, wherein the frame body constituting the battery holder is provided with a holding plate for mounting electrical units.

4. The electrical unit containing structure according to claim 1, wherein an accelerator position sensor is provided on the frame above the battery holder.

5. The electrical unit containing structure according to claim 4, wherein an electrical unit case covers the accelerator position sensor, and is provided on the frame above the battery holder.

6. The electrical unit containing structure according to claim 1, wherein a main switch is provided at a position which is rearward of a lower rear side of the head pipe, under the frame and forward of the battery holder.

7. The electrical unit containing structure according to claim 6,
wherein a side cowl is provided to cover at least a part of left and right side surfaces of an electrical unit case, and
the side cowl covers at least a part of the main switch from a lateral side of the vehicle.

8. A vehicle, comprising:
a driving motor;
a frame including a rear portion extending toward a rear of the vehicle from a head pipe, said driving motor being disposed under the rear portion;
a battery disposed between the frame and the driving motor;
a battery holder configured to contain the battery, said battery holder being disposed above the driving motor and below the frame, said battery holder including a holder body portion in which the battery is contained and held, a plate member detachable from the holder body portion at a lateral side of the vehicle and by which lateral movement of the battery is restrained, and a terminal part disposed at a rear part of the holder body portion, said terminal part configured to connect the battery to the driving motor,
wherein the battery and the terminal part are detachably connected to each other, said vehicle further comprising
a controller fixing part, by which a controller for controlling a power supply between the battery and the driving motor is fixed to the vehicle, said controller fixing part being provided at a lower portion of the holder body portion, wherein the controller fixing part is disposed forwardly of the driving motor and below the battery.

9. The vehicle according to claim 8, wherein the battery holder comprises a lattice frame body.

10. The vehicle according to claim 9, wherein the frame body includes a holding plate configured to support electrical units mounted thereupon.

11. The vehicle according to claim 8, further comprising an accelerator position sensor disposed on the frame, above the battery holder.

12. The vehicle according to claim 11, further comprising an electrical unit case configured to cover the accelerator position sensor, said electrical unit case being disposed on the frame above the battery holder.

13. The vehicle according to claim 8, further comprising a main switch disposed rearward of a lower rear side of the head pipe, under the frame and forward of the battery holder.

14. The vehicle according to claim 13, further comprising a side cowl configured to cover at least a part of left and right side surfaces of an electrical unit case, and to cover at least a part of the main switch from a lateral side of the vehicle.

15. The vehicle according to claim 8, wherein the vehicle comprises a saddle type electric vehicle.

16. A vehicle, comprising:
driving means for providing motive power for the vehicle;
frame means for supporting vehicle components thereupon, said frame means including a rear portion extending toward a rear of the vehicle from a head pipe, said driving means being disposed under the rear portion;
battery means disposed between the frame means and the driving means;
battery holding means for holding the battery means, said battery holding means being disposed above the driving means and below the frame means, said battery holding means including a holder body portion and a plate member detachable from the holder body portion at a lateral side of the vehicle and by which lateral movement of the battery means is restrained, and a terminal part disposed at a rear part of the holder body portion, said terminal part for connecting the battery means to the driving means, wherein the battery means and the terminal part are detachably connected to each other, said vehicle further comprising controller fixing means for supporting a controller means for controlling a power supply between the battery means and the driving means, said controller means being disposed at a lower portion of the holder body portion, wherein the controller fixing means is disposed forwardly of the driving means and below the battery means.

17. The vehicle according to claim 16, wherein the battery holding means comprises a lattice frame body.

18. The vehicle according to claim 17, wherein the frame body includes a holding plate configured to support electrical units mounted thereupon.

19. The vehicle according to claim 16, further comprising sensor means for sensing an accelerator position, said sensor means disposed on the frame means, above the battery holder means.

20. The vehicle according to claim 19, further comprising case means for covering the sensor means, said case means being disposed on the frame means above the battery holder means.

* * * * *